(12) United States Patent
Tamelli (10) Patent No.: US 11,378,196 B2
(45) Date of Patent: Jul. 5, 2022

(54) VALVE OVERRIDE ASSEMBLY, VALVE, AND METHOD

(71) Applicant: Dana Motion Systems Italia S.R.L., Reggio Emilia (IT)

(72) Inventor: Andrea Tamelli, Vezzano sul Crostolo (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 17/127,539

(22) Filed: Dec. 18, 2020

(65) Prior Publication Data

US 2021/0190226 A1    Jun. 24, 2021

(30) Foreign Application Priority Data

Dec. 20, 2019  (EP) ...................................... 19218560

(51) Int. Cl.
*F16K 27/02*    (2006.01)

(52) U.S. Cl.
CPC .................................. *F16K 27/029* (2013.01)

(58) Field of Classification Search
CPC ...................................................... F16K 27/029
See application file for complete search history.

(56) References Cited

U.S. PATENT DOCUMENTS 6,310,530 B1 * 10/2001 Jacobus ................ H01F 7/1607
335/238

* cited by examiner

*Primary Examiner* — Eric Keasel
(74) *Attorney, Agent, or Firm* — McCoy Russell LLP (57) ABSTRACT

A valve override assembly, comprising: a housing comprising a first portion including a cavity and a second portion. The first portion and the second portion arranged along an axial direction. A core arranged at least partially within the cavity of the first portion of the housing, wherein the core is movable with respect to the housing along the axial direction and comprises a first engagement portion. An override member arranged at least partially within the second portion of the housing such that the override member is movable with respect to the housing along the axial direction.

18 Claims, 4 Drawing Sheets

VALVE OVERRIDE ASSEMBLY, VALVE, AND METHOD

CROSS-REFERENCE TO RELATED APPLICATION

The present application claims priority to European Patent Application No. 19 218 560.1, entitled "VALVE OVERRIDE ASSEMBLY, VALVE, AND METHOD", and filed on Dec. 20, 2019. The entire contents of the above-listed application are hereby incorporated by reference for all purposes.

TECHNICAL FIELD

The present disclosure concerns a valve override assembly, in particular a valve override assembly for manually operating a valve, which may be an actuated valve such as a solenoid valve. The present disclosure further concerns a valve comprising such a valve override assembly and a method for assembling a valve override assembly.

BACKGROUND AND SUMMARY

Examples of valve override assemblies or valve override devices are known in the art. Such valve override assemblies may be used to manually operate a valve which, during normal operation, is operated by means of an actuator, in cases when the actuator or a power supply required to operate the actuator is malfunctioning. For example, a valve override assembly may be used to manually set (also referred to as override) an operational state of a solenoid valve or other actuated valve to an open state, a closed state, or a partially open state in such a way that the set operational state is maintained independently of the operation of an actuator or power supply.

In some cases, a valve override assembly may be included as a permanent part of a valve; in other cases, a valve override assembly may be installed in a valve which is already in use, either as an add-on component or as a replacement for a valve component another valve component. In either case, the valve and the valve override assembly or parts of the valve override assembly must be assembled together. This assembly frequently involves a complicated and therefore costly and time-consuming procedure. The associated cost and risk is exacerbated when assembly has to occur during a malfunction.

For example, for a known type of valve override assembly, assembling the valve override unit involves inserting an override rod through a bore disposed in a movable valve component from one end such that it protrudes through the bore at an opposite end of the movable valve component, and subsequently fixing the override rod by means of a nut and set screw arranged at the opposite end. This procedure requires careful centering of the override rod with respect to the bore and involves numerous steps.

Accordingly, there is demand for a valve override assembly that avoids or reduces the aforementioned shortcomings and, furthermore, for a valve including such a valve override assembly and for a method of assembling such a valve override assembly.

This problem is solved by a valve override assembly, a valve, and a method according to the embodiments described herein. Additional embodiments, further developments, and applications become apparent in combination with the present disclosure.

The presently proposed valve override assembly comprises: a housing comprising a first portion including a cavity, and a second portion, the first portion and the second portion arranged along an axial direction; a core arranged at least partially within the cavity of the first portion of the housing, wherein the core is movable with respect to the housing along the axial direction and comprises a first engagement portion; an override member arranged at least partially within the second portion of the housing such that the override member is movable with respect to the housing along the axial direction, the override member comprising a second engagement portion for engagement with the first engagement portion; wherein the first engagement portion of the core is engageable with the second engagement portion of the override member by pushing the core and the override member together along the axial direction, such that when the first engagement portion is engaged with the second engagement portion, the override member restricts a motion of the core away from the second portion of the housing along the axial direction.

Providing the first engagement portion of the core such that it is engageable with the second engagement portion of the override member by pushing the core and the override member together as described above allows for the valve override assembly to be assembled in a simple manner, thereby saving time and cost.

For instance, restricting the motion of the core away from the second portion of the housing may set or maintain an operational state of a valve connectable or connected to the valve override assembly by restricting a motion of a movable valve component, such as an actuating element, connectable or connected with the core. Such an actuating element may be biased away from the second portion of the housing along the axial direction, such that restricting the motion of the core away from the second portion of the housing along the axial direction or removing said restriction allows overriding the position of the actuating element and thereby an operational state of the valve. For instance, the restricted position of the actuating element may correspond to an open state of the valve, and the unrestricted position of the actuating element, which is assumed due to the bias, may correspond to an closed state of the valve or vice versa.

The housing may comprise a stop configured to restrict a motion of the core towards the second portion of the housing along the axial direction. The stop allows the core to be restricted to a defined position when the motion of the core away from the second portion of the housing along the axial direction is restricted by the overriding member.

One of the first engagement portion and the second engagement portion may comprise a female portion. The other of the first engagement portion and the second engagement portion may comprise a male portion. The male portion may be insertable into the female portion to engage the first engagement portion and the second engagement portion through a form fit between the first engagement portion and the second engagement portion along the axial direction. In particular, a force required to insert the male portion into the female portion may be substantially smaller than a force required to remove the male portion from the female portion and/or insertion of the male portion into the female portion by a predetermined distance may be irreversible (irreversible meaning that the male portion cannot be removed from the female portion without damaging a part of the male portion and/or a part of the female portion). Providing a male portion and a female portion configured to establish a form fit is a simple and robust way to implement the first and second engagement portion with the advantages described above.

The valve override assembly may further comprise an elastic element mounted between the male portion and the female portion. The elastic element may be deformable in a lateral direction perpendicular to the axial direction between a first state in which the elastic element has a first lateral extension and a second state in which the elastic element has a second lateral extension different from the first lateral extension. The elastic element may be configured to be in the first state to allow insertion of the male portion into the female portion and to be in the second state when the male portion has been inserted into the female portion a predetermined distance to form the form fit.

The elastic element may be mounted on the male portion such that movement of the elastic element along the axial direction relative to the male portion is restricted. The first state may be a compressed state and the second state may be an expanded state such that the second lateral extension of the elastic element in the second state is larger than the first lateral extension of the elastic element in the first state.

The female portion may comprise a tapered portion configured to force the elastic element toward the first state as the male portion and the elastic element mounted on the male portion are inserted into the tapered portion.

The tapered portion may transition into a shoulder portion of the female portion. A lateral cross section of the female portion may increase at the shoulder portion, such that the elastic element mounted on the male portion is allowed to expand to the second state to form the form fit when the elastic element is inserted into the female portion past the shoulder portion.

The male portion may further comprise a first circumferential groove, configured to receive the elastic element in the first state. The male portion may also comprise a second circumferential groove, configured to receive the elastic element in the second state. A first diameter of the male portion at the first circumferential groove may be smaller than a second diameter of the male portion at the second circumferential groove. A third diameter of the male portion between the first circumferential groove and the second circumferential groove may be greater than the first diameter and greater than the second diameter.

The override member and the second portion of the housing may comprise mutually engageable threaded portions for securing the override member within the second portion of the housing.

The core may be magnetic or non-magnetic. The core may be configured to be disposed as a pole tube of a solenoid valve. The core may be connectable or connected to a magnetic element of a solenoid valve.

The first engagement portion of the core may comprise the female portion. The second engagement portion of the override member may comprise the male portion. The male portion may protrude into or be configured to protrude into the cavity of the first portion of the housing. The female portion may protrude or be configured to protrude into a portion of the second portion external to the first portion.

The valve override assembly may further comprise a biasing member configured to bias the core away from the second portion of the housing or towards the second portion of the housing. In this way, the core may act as an actuating element as described above or it may be connectable or connected with the actuating element to bias the actuating element away from the second portion along the axial direction. The biasing member may be or comprise a spring and/or a compressible element and/or any other kind of biasing element.

The proposed valve comprises: an actuating element movable between an open position, in which the valve is open, and a closed position, in which the valve is closed; and the above-described valve override assembly, wherein the core of the valve override assembly is connected to the actuating element such that the override member being engaged with the core restricts a motion of the actuating element towards the open position or towards the closed position.

The proposed valve may be a solenoid valve. For example, the valve may be a solenoid valve of a normally open type, which is closed when a voltage is applied, or a solenoid valve of a normally closed type, which is opened when a voltage is applied. Alternatively, the valve may be any other kind of valve, in particular a valve whose operational state (e. g. open or closed state) may be set by applying a voltage. A valve with a valve override assembly as described above may be assembled in a simple and cost-saving manner and provide robust and safe operation, especially during an emergency condition.

The proposed method for assembling a valve override assembly of the type proposed above comprises the steps of inserting the override member into the second portion of the housing and pushing the override member and the core together such that the first engagement portion of the core is engaged with the second engagement portion of the override member, the override member restricting the motion of the core away from the second portion of the housing along the axial direction.

This method exploits the structural features of valve override assembly as described above in order to provide a simple, fast and cost-efficient way of assembling a valve override assembly and providing a valve with an override option. The method may comprise additional steps (for instance, as required by additional features as described above).

BRIEF DESCRIPTION OF THE FIGURES

The above, as well as other advantages of the presently proposed valve override assembly, valve and method, will become apparent to those skilled in the art from the following detailed description of exemplary embodiments when considered in the light of the accompanying schematic drawings, in which

Recurring features in FIGS. 1-9 are provided with identical reference numerals and may be partially omitted where these features are not referred to, in the following, with reference to a given drawing.

FIGS. 1-9 are shown approximately to scale.

DETAILED DESCRIPTION

Figure 1:
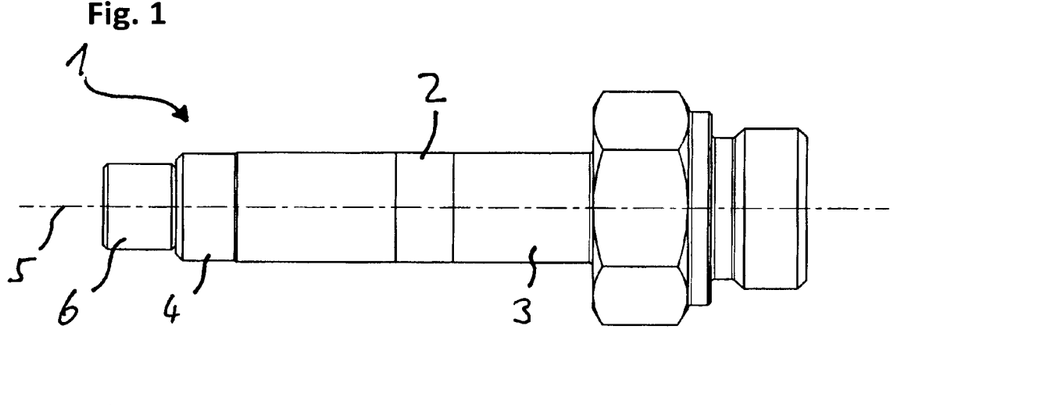
FIG. 1 shows a side view of a valve override assembly.

The valve override assembly 1 shown in FIG. 1 comprises a housing 2 comprising a first portion 3 and a second portion 4, the first portion 3 and the second portion 4 arranged along an axial direction, the axial direction being defined as a direction along a central axis 5. The housing 2 forms a radially symmetric tube, wherein an inner diameter of the second portion 4 is smaller than an inner diameter of the first portion 3. Alternatively, the housing 2 may have a different shape, for instance, the housing 2 may have a rectangular or square cross-section.

The valve override assembly 1 further comprises an override member 6 arranged at least partially within the second portion 4 of the housing 2 such that the override member 6 is movable with respect to the housing 2 along the axial direction.

Figure 2:
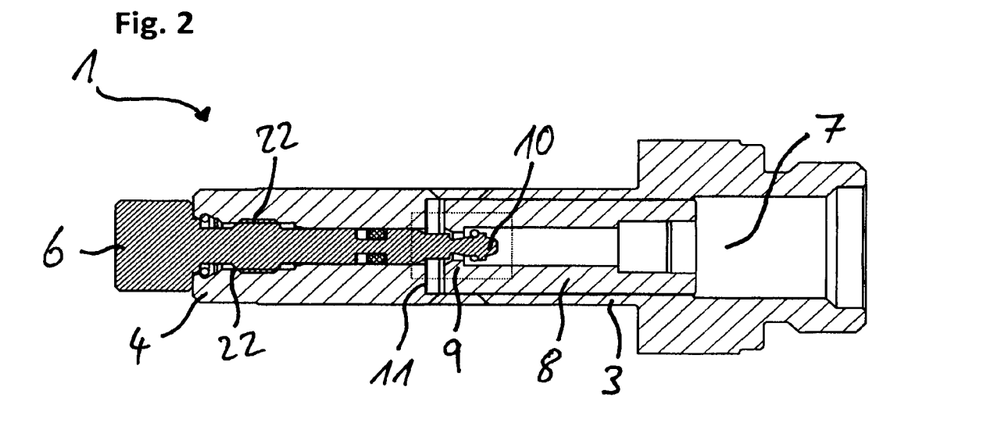
FIG. 2A shows a cross-sectional view of the valve override assembly shown in FIG. 1.
FIG. 2B shows a detailed view of a portion of FIG. 2.
Figure 2A:
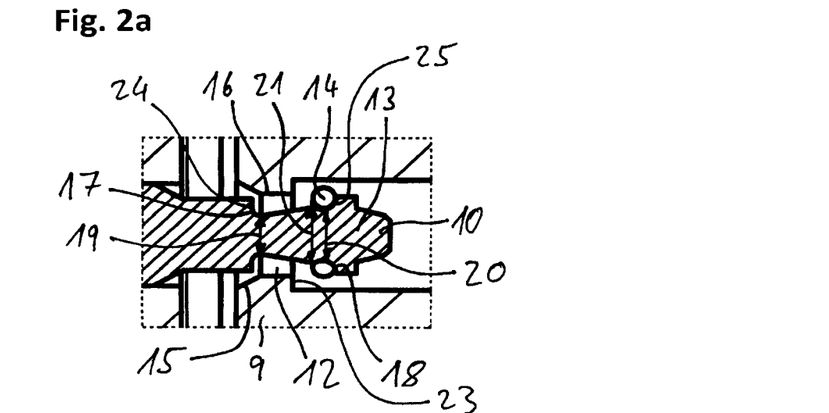

FIG. 2A shows a cross-section of the valve override assembly 1 in a plane containing the central axis 5 shown in FIG. 1. As shown in FIG. 2A, the first portion 3 of the housing 2 includes a cavity 7.

A core 8 is arranged within the cavity 7 of the first portion 3 of the housing 2, the core 8 being movable with respect to the housing 2 along the axial direction. The core 8 is a hollow tube open at both ends. Alternatively, the core may be constructed in different ways, for example, as a solid block or a mainly solid block with cavities arranged only at one or several end portions.

The core 8 comprises a first engagement portion 9. The override member 6 comprises a second engagement portion 10 for engagement with the first engagement portion 9.

The first engagement portion 9 of the core 8 is engageable with the second engagement portion 10 of the override member 6 by pushing the core 8 and the override member 6 together along the axial direction, such that when the first engagement portion 9 is engaged with the second engagement portion 10, the override member restricts a motion of the core 8 away from the second portion 4 of the housing 2 along the axial direction as explained in more detail below.

The housing 2 comprises a stop 11, formed as a narrowing of an inner diameter of the housing 2, configured to restrict a motion of the core 8 towards the second portion 4 of the housing 2 along the axial direction. Alternatively, the stop may be formed in different ways, e. g. as one or several protrusions of an inner wall of the housing 2.

The override member 6 and the second portion 4 of the housing 2 comprise mutually engageable threaded portions 22 for securing the override member 6 within the second portion 4 of the housing 2.

The override member 6 is movable along the axial direction with respect to the housing 2 by means of the threaded portions 22 by rotating the override member 6 with respect to the housing 2. In the following, pushing, moving, inserting, and retracting the override member 6 or portions thereof is understood to include rotating the override member 6 with respect to the housing 2 such that the override member 6 is moved with respect to the housing 2 by means of the threaded portions 22.

Alternatively, a different mechanism for moving the override member 6 along the axial direction with respect to the housing 2 may be provided, for example, the override member 6 may be slidably disposed within the housing 2 and fixable by means of a set screw.

The valve override assembly 1 may further comprise a biasing member, configured to bias the core 8 away from the second portion 4 of the housing 2 (such as a spring disposed between the stop 11 and the core 8) or towards the second portion of the housing (such as a spring disposed within the cavity 7 adjacent to the core 8).

FIG. 2B shows a detailed view of a portion of FIG. 2A indicated by a box with a dotted outline.

As shown in FIG. 2B, the first engagement portion 9 comprises a female portion 12. The second engagement portion 10 comprises a male portion 13. Alternatively, the first engagement portion 9 may comprise the male portion 13, and the second engagement portion 10 may comprise the female portion 12.

The male portion 13 is configured to protrude into the cavity 7 of the first portion 3 of the housing 2. An elastic element 14 is mounted between the male portion 13 and the female portion 12. The elastic element 14 is a ring-shaped element disposed around the male portion 13. Alternatively, the elastic element may have different shapes, for instance, the elastic element may be a block-shaped element inserted into a groove or recess of the male portion 13 such that it protrudes laterally outward from the male portion 13. The valve override assembly 13 may comprise two or more elastic elements 14 of identical or different types. The elastic element 14 may comprise an elastic polymer and/or other elastic materials.

The elastic element 14 is mounted on the male portion 13 such that movement of the elastic element 14 along the axial direction relative to the male portion 13 is restricted by a first stop portion 24 and a second stop portion 25. The elastic element 14 is deformable by being compressed in a lateral direction perpendicular to the axial direction.

The female portion 12 comprises a tapered portion 15. The tapered portion 15 transitions into a shoulder portion 16 of the female portion 12. A lateral cross section of the female portion 12 increases at the shoulder portion 16, such that the elastic element 14 mounted on the male portion 13 is allowed to expand to form a form fit when the elastic element 14 is inserted into the female portion 12 past the shoulder portion 16, more in particular past an engagement surface 23 of the shoulder portion 16.

The male portion 13 comprises a first circumferential groove 17, configured to receive the elastic element 14 in a first state, which is a compressed state. The male portion 13 also comprises a second circumferential groove 18, configured to receive the elastic element 14 in a second state, which is an expanded state.

A first diameter 19 of the male portion 13 at the first circumferential groove 17 is smaller than a second diameter 20 of the male portion 13 at the second circumferential groove 18. A third diameter 21 of the male portion 13 between the first circumferential groove 17 and the second circumferential groove 18 is greater than the first diameter 19 and greater than the second diameter 20. Diameters of the male portion 13 at the first stop portion 24 and the second stop portion 25 are greater than each of the first diameter 19 and the second diameter 20 and the third diameter 21. Along the male portion 13 going from the first circumferential groove 17 to the second circumferential groove 18, the diameter of the override member 6 increases until it assumes the third diameter 21 and then decreases until it assumes the second diameter 22.

Alternatively to the example shown here, the first and second engagement portion may be formed in different ways. For example, one of the first and second engagement portion may comprise a movable (e. g. pivotable and/or slidable and/or expandable) portion, such as a hook or clasp or protrusion, configured to be movable to form a form fit and/or a frictional fit upon engaging with the other of the first and second engagement portion.

FIGS. 3-8 illustrate various steps of a method for assembling the valve override assembly 1.

Figure 3:
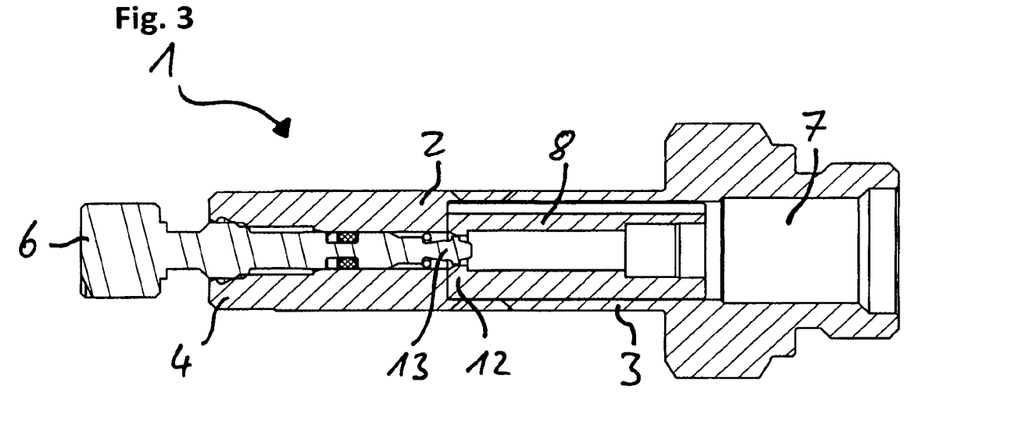
FIGS. 3-8 show cross-sectional view of the valve override assembly shown in FIG. 1 during different steps of a method for assembling a valve override assembly.

FIG. 3 shows the valve override assembly 1 after a first method step. The first method step includes inserting the override member 6 into the second portion 4 of the housing 2 such that the male portion 13 protrudes into the cavity 7 of the first portion 3 of the housing 2 and is inserted into the female portion 12 of the core 8.

Figure 4:
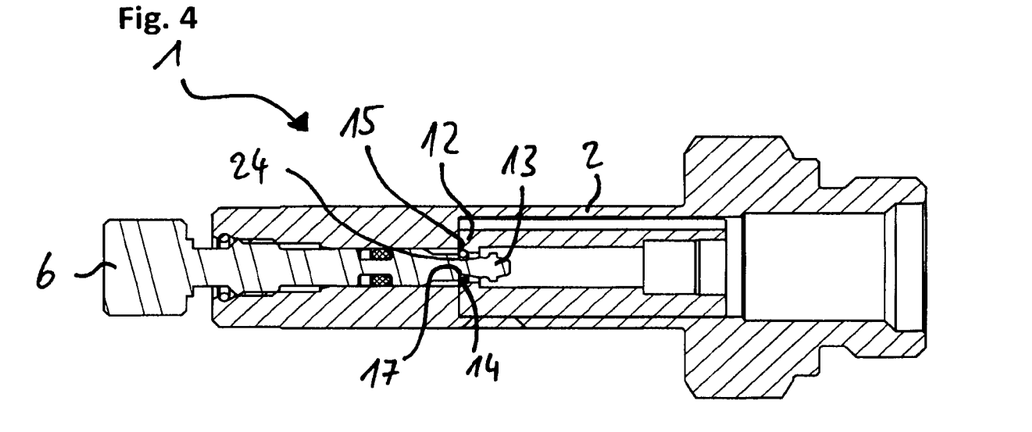

FIG. 4 shows the valve override assembly 1 after a second method step. The second method step includes moving the male portion 13 further into the female portion 12 such that the tapered portion 15 engages the elastic element 14 and pushes the elastic element 14 into the first circumferential groove 17 (if the elastic element 14 is not already in the first circumferential groove 17). Consequently, the female portion 12 is configured to force the elastic element 14 toward the first state as the male portion 13 and the elastic element 14 mounted on the male portion 12 are inserted into the tapered portion 15. The first stop portion 23 prevents the elastic element 14 from sliding past the first circumferential groove 17.

Figure 5:
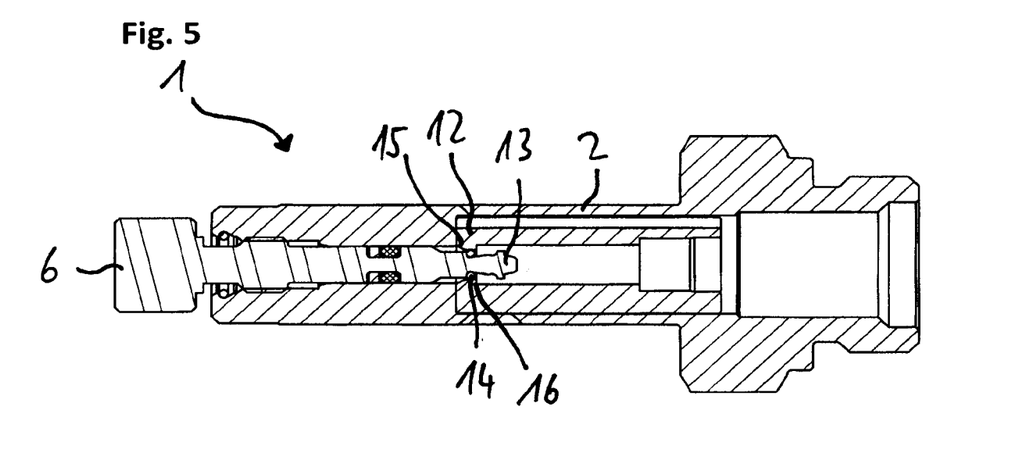

FIG. 5 shows the valve override assembly 1 after a third method step. The third method step includes moving the male portion 13 further into the female portion 12 until the elastic element 14 has cleared the tapered portion 12 and is arranged within the shoulder portion 16.

During the third method step, the tapered portion 15 compresses the elastic element 14 towards the male portion 13 in the lateral direction. When the elastic element is arranged within the shoulder portion 16, the elastic element 14 is in the first state. In the first state, the elastic element 14 has a first lateral extension corresponding to an inner diameter of the shoulder portion 16.

Figure 6:
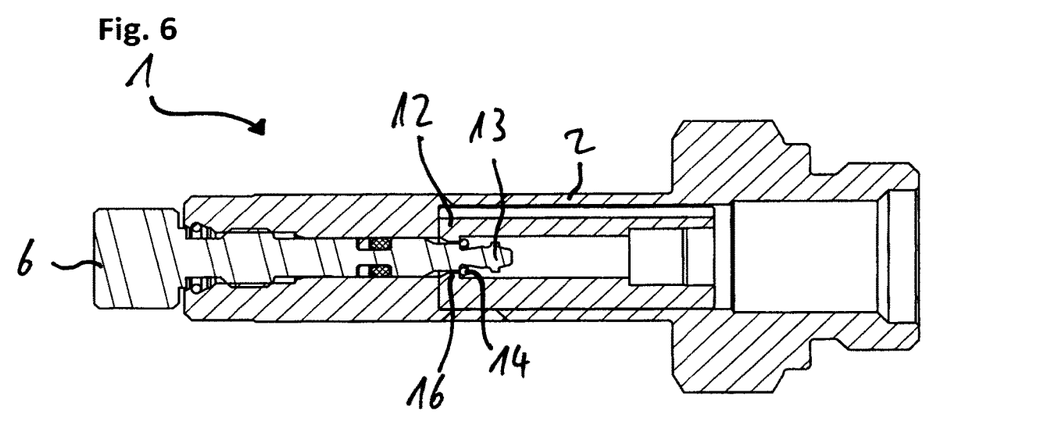

FIG. 6 shows the valve override assembly 1 after a fourth method step. The fourth method step includes moving the male portion 13 further into the female portion 12 until the elastic element 14 clears the shoulder portion 16. After clearing the shoulder portion 16, the elastic element 14 is free to expand into the second state. In the second state, the elastic element 14 has a second lateral extension which is larger than the first lateral extension.

As illustrated by FIGS. 4-6, the elastic element 14 is configured to be in the first state to allow insertion of the male portion 13 into the female portion 12 and to be in the second state when the male 13 portion has been inserted into the female portion 12 a predetermined distance to form the form fit. Thus, the male portion 13 is insertable into the female portion 12 to engage the first engagement portion 9 and the second engagement 10 portion through a form fit between the first engagement portion 9 and the second engagement portion 10 along the axial direction.

Figure 7:
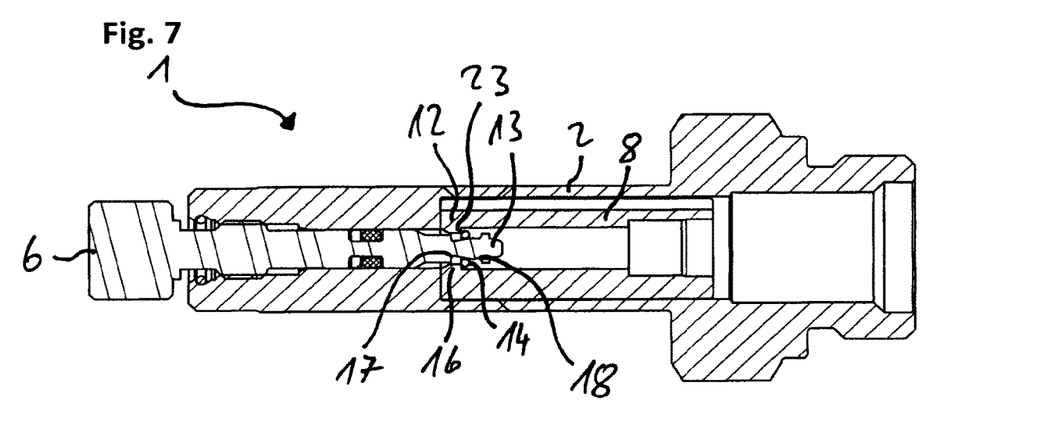

FIG. 7 shows the valve override assembly 1 after a fifth method step. The fifth method step includes partially retracting the override member 6 from the housing 2 such that the male portion 13 is partially retracted from the female portion 12. During this retraction, the elastic member 14 engages with the engagement surface 23 of the core 8 such that the elastic element 14 is pushed along the male portion 13, out of the first circumferential groove 17 and towards the second circumferential groove 18.

Figure 8:
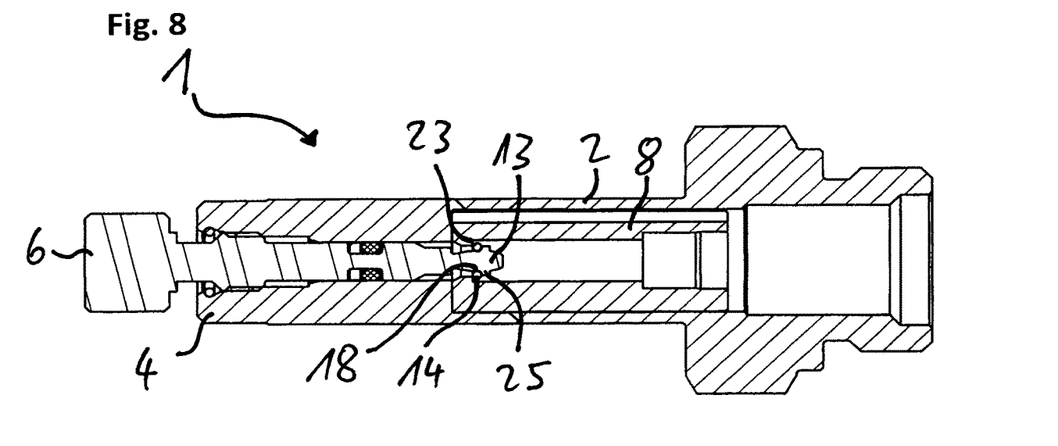

FIG. 8 shows the valve override assembly 1 after a sixth method step. The sixth method step includes further retracting the override member 6 from the housing 2 until the elastic element 14 is arranged in the second circumferential groove 18 and prevented from sliding further along the male portion 13 by the second stop portion 25. The elastic element 14 in the second state being engaged both with the engagement surface 23 and with the second stop portion 25 forms the form fit to restrict the motion of the core 8 away from the second portion 4.

As shown in FIGS. 3-8 and described above, the method thus includes pushing the override member 6 and the core 8 together such that the first engagement portion 9 of the core 8 is engaged with the second engagement portion 10 of the override member 6, the override member 6 restricting the motion of the core 8 away from the second portion 4 of the housing 2 along the axial direction.

Figure 9:
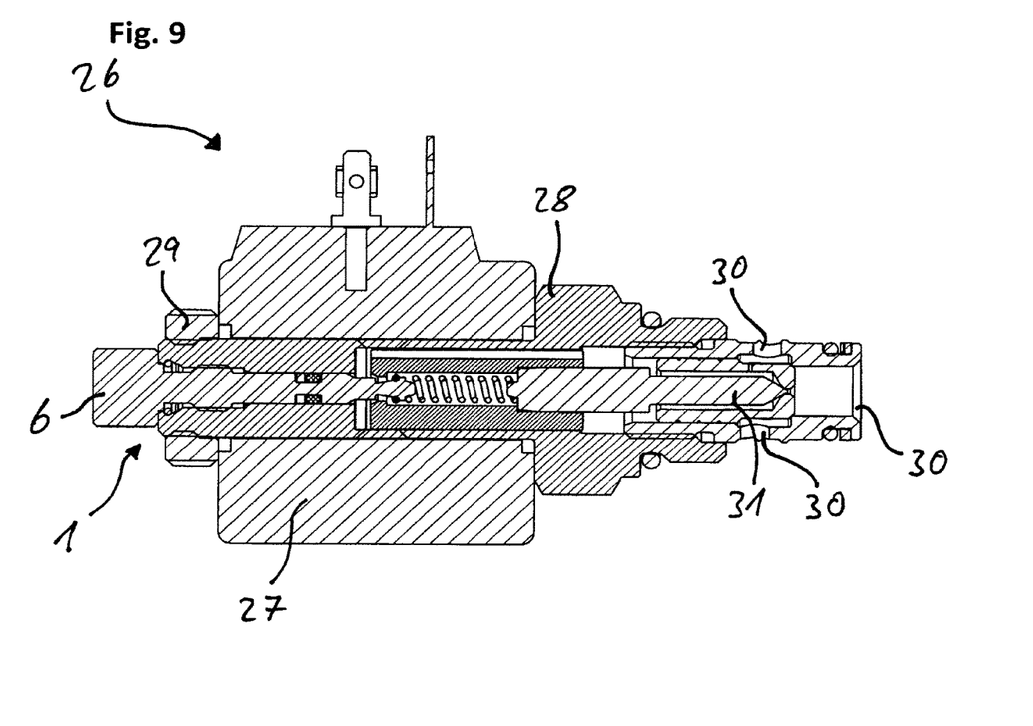
FIG. 9 shows a valve comprising the valve override assembly shown in FIG. 1.

The valve 26 shown in FIG. 9 is a solenoid valve comprising a valve override assembly 1 as described above. The valve 26 comprises a coil tube 27 with a coil wound around a hollow core of the coil tube 27. The valve override assembly 1 is arranged partially inside the coil tube 27 such that the core 8 is arranged partially inside the coil tube 27. The valve override assembly 1 is fixed to the coil tube 27 by means of an enlarged portion 28 of the housing 2 and a nut 29.

The core 8 of the valve override assembly 1 is rigidly connected to an actuating element 31 movable between an open position, in which the valve is open, and a closed position, in which the valve is closed. In FIG. 9, the valve is shown in the closed position, in which the actuating element is moved away from the second portion 4 of the housing 2 such that fluid ports 30 of the valve 26 are blocked by the actuating element 31. In the open position (not shown)

The core 8 comprises a magnetic material. The coil inside the coil tube 27 is configured to exert a force on the core 8 along the axial direction towards the second portion 4 of the housing 2 when a voltage is applied to the coil 8, thereby moving the actuating element 31 to the open position. The core 8 (and thereby the actuating element 31) is biased towards the closed position by means of a bias member (not shown). In other words, the valve 26 is a solenoid valve of a normally closed type, which is opened when a voltage is applied to the coil. Alternatively, the valve may be a solenoid valve of a normally open type, which is closed when a voltage is applied.

The core 8 being rigidly connected to the actuating element 31 has the effect that the override member 6 being engaged with the core 8 to restrict a motion of the core 8 away from the second portion 4 restricts a motion of the actuating element 31 towards the closed position and counteracts the force exerted by the bias member to close the valve. Adjustment of the override member 6 of the valve override assembly 1 therefore allows overriding an operational state of the valve 6, in particular, by manually setting the actuating element 31 to the closed position or the open position.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE NUMERALS

1 Valve override assembly
2 Housing
3 First portion
4 Second portion
5 Central axis
6 Override member
7 Cavity
8 Core
9 First engagement portion
10 Second engagement portion
11 Stop
12 Female portion
13 Male portion
14 Elastic element
15 Tapered portion
16 Shoulder portion
17 First circumferential groove
18 Second circumferential groove
19 First diameter
20 Second diameter
21 Third diameter
22 Threaded portion
23 Engagement surface
24 First stop portion
25 Second stop portion
26 Valve
27 Coil tube
28 Enlarged portion
29 Nut
30 Fluid port
31 Actuating element

The invention claimed is:

1. A valve override assembly, comprising:
a housing comprising a first portion including a cavity, and a second portion, the first portion and the second portion arranged along an axial direction;
a core arranged at least partially within the cavity of the first portion of the housing, wherein the core is movable with respect to the housing along the axial direction and comprises a first engagement portion;
an override member arranged at least partially within the second portion of the housing such that the override member is movable with respect to the housing along the axial direction, the override member comprising a second engagement portion for engagement with the first engagement portion;
wherein the first engagement portion of the core is engageable with the second engagement portion of the override member by pushing the core and the override member together along the axial direction, such that when the first engagement portion is engaged with the second engagement portion, the override member restricts a motion of the core away from the second portion of the housing along the axial direction;
one of the first engagement portion and the second engagement portion comprises a female portion and the other of the first engagement portion and the second engagement portion comprises a male portion which is inserted into the female portion; and
an elastic element mounted between the male portion and the female portion, the elastic element deformed between a first state and a second state, the first state of the elastic element sized to fit through the female portion when the male portion is inserted through the female portion in a first direction, and the second state of the elastic element sized to interfere with the female portion and block movement of the male portion in a second direction opposite the first direction.

2. The valve override assembly according to claim 1, wherein the housing comprises a stop configured to restrict a motion of the core towards the second portion of the housing along the axial direction.

3. The valve override assembly according to claim 1, wherein the male portion is insertable into the female portion to engage the first engagement portion and the second engagement portion through a form fit between the first engagement portion and the second engagement portion along the axial direction.

4. The valve override assembly according to claim 3, wherein the first engagement portion of the core comprises the female portion and the second engagement portion of the override member comprises the male portion, and wherein the male portion protrudes into or is configured to protrude into the cavity of the first portion of the housing.

5. The valve override assembly according to claim 1, wherein the override member and the second portion of the housing comprise mutually engageable threaded portions for securing the override member within the second portion of the housing.

6. The valve override assembly according to claim 1, wherein the core is magnetic.

7. The valve override assembly according to claim 1, further comprising a biasing member configured to bias the core away from the second portion of the housing or towards the second portion of the housing.

8. A valve comprising:
an actuating element movable between an open position, in which the valve is open, and a closed position, in which the valve is closed; and
the valve override assembly according to claim 1, wherein the core of the valve override assembly is connected to the actuating element such that the override member being engaged with the core restricts a motion of the actuating element towards the open position or towards the closed position.

9. A valve override assembly, comprising:
a housing, comprising:
a first portion and a second portion arranged along an axial direction, the first portion including a cavity;
a core arranged at least partially within the cavity, the core movable with respect to the housing along the axial direction, and the core comprises a first engagement portion;
an override member arranged at least partially within the second portion of the housing such that the override member is movable with respect to the housing along the axial direction, the override member comprising a second engagement portion;
the first engagement portion of the core engageable with the second engagement portion of the override member by pushing the core and the override member together along the axial direction such that when the first engagement portion is engaged with the second engagement portion, the override member restricts a motion of the core away from the second portion of the housing along the axial direction;
one of the first engagement portion and the second engagement portion comprises a female portion and the other of the first engagement portion and the second engagement portion comprises a male portion which is insertable into the female portion to engage the first engagement portion and the second engagement portion through a form fit; and
an elastic element mounted between the male portion and the female portion and deformable in a lateral direction perpendicular to the axial direction between a first state in which the elastic element has a first lateral extension and a second state in which the elastic element has a second lateral extension different from the first lateral extension, the elastic element configured to be in the first state to allow insertion of the male portion into the female portion and to be in the second state when the male portion has been inserted into the female portion a predetermined distance to form the form fit.

10. The valve override assembly according to claim 9, wherein the elastic element is mounted on the male portion such that movement of the elastic element along the axial direction relative to the male portion is restricted, wherein the first state is a compressed state and the second state is an expanded state such that the second lateral extension of the elastic element in the second state is larger than the first lateral extension of the elastic element in the first state.

11. The valve override assembly according to claim 10, wherein the female portion comprises a tapered portion configured to force the elastic element toward the first state as the male portion and the elastic element mounted on the male portion are inserted into the tapered portion.

12. The valve override assembly according to claim 11, wherein the tapered portion transitions into a shoulder portion of the female portion, wherein a lateral cross section of the female portion increases at the shoulder portion, such that the elastic element mounted on the male portion is allowed to expand to the second state to form the form fit when the elastic element is inserted into the female portion past the shoulder portion.

13. The valve override assembly according to claim 10, wherein the male portion further comprises:
a first circumferential groove, configured to receive the elastic element in the first state; and
a second circumferential groove, configured to receive the elastic element in the second state,
wherein a first diameter of the male portion at the first circumferential groove is smaller than a second diameter of the male portion at the second circumferential groove and a third diameter of the male portion between the first circumferential groove and the second circumferential groove is greater than the first diameter and greater than the second diameter.

14. A method, comprising:
providing a valve override assembly, comprising:
a housing including a cavity,
a core arranged at least partially within the cavity and comprising a first engagement portion, and
an override member arranged at least partially within the housing and the override member comprising a second engagement portion;
inserting the override member into the housing; and
pushing the override member and the core together to engage the first engagement portion with the second engagement portion, engagement of the first engagement portion and the second engagement portion comprises inserting a male portion into a female portion,
deforming an elastic element between a first state and a second state, the elastic element mounted between the male portion and the female portion, the first state of the elastic element shaped to fit through the female portion when the override member and the core are pushed together, and the second state of the elastic element shaped to interfere with the female portion and block movement of the male portion in a direction opposite of the override member and the core being pushed together;
restricting motion of the core via the override member engaged with the core and the elastic element.

15. The method of claim 14, wherein the elastic element is mounted on the male portion such that movement of the elastic element along male portion is restricted, wherein the first state is a compressed state and the second state is an expanded state such that the second state is larger than the first state.

16. The method of claim 14, wherein the female portion comprises a tapered portion which compresses the elastic element to the first state as the male portion and the elastic element mounted on the male portion are inserted into the tapered portion.

17. The method of claim 14, wherein the female portion comprises a tapered portion which compresses the elastic element to the first state as the male portion and the elastic element mounted on the male portion are inserted into the tapered portion, and the tapered portion transitions into a shoulder portion of the female portion such that the elastic element is allowed to expand to the second state after the elastic element is inserted past the shoulder portion.

18. The method of claim 14, wherein the male portion comprises:
   a first circumferential groove corresponding to the shape of the elastic element in the first state; and
   a second circumferential groove corresponding to the shape of the elastic element in the second state, wherein a second diameter at the second circumferential groove is larger than a first diameter at the first circumferential.

* * * * *